No. 677,106.  
A. ST. CLAIR, Dec'd.  
E. D. ST. CLAIR, Administratrix.  
SPOON HAVING ADJUSTABLE AND REMOVABLE HANDLE.  
(Application filed Mar. 24, 1900.)  
Patented June 25, 1901.
(No Model.)
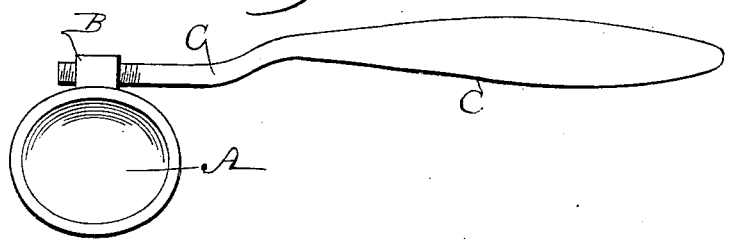
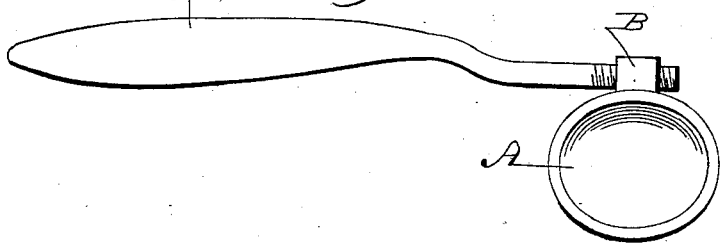
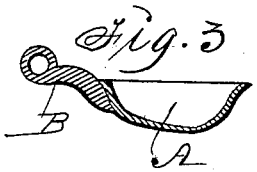

UNITED STATES PATENT OFFICE.

ALEXANDER ST. CLAIR, OF DES MOINES, IOWA, ASSIGNOR OF ONE-HALF TO HERMAN C. BACHRODT, OF SAME PLACE; EMMA D. ST. CLAIR ADMINISTRATRIX OF SAID ALEXANDER ST. CLAIR, DECEASED.

SPOON HAVING ADJUSTABLE AND REMOVABLE HANDLE.

SPECIFICATION forming part of Letters Patent No. 677,106, dated June 25, 1901.

Application filed March 24, 1900. Serial No. 9,996. (No model.)

*To all whom it may concern:*

Be it known that I, ALEXANDER ST. CLAIR, a citizen of the United States, residing at Des Moines, in the county of Polk and State of Iowa, have invented a new and useful Spoon Having an Adjustable and Removable Handle, of which the following is a specification.

My object is to prevent the annoyances incident to the use of spoons for conveying soup and other kinds of food into a person's mouth. Etiquette requires the side of the spoon to be introduced between the lips, and in so doing food is liable to adhere to the lips and mustache of gentlemen, so as to have a repulsive appearance to observers and a discomfort to the person who is eating.

A further object is to adapt a spoon to be changed as required to be used advantageously in the left hand as well as the right.

My invention consists in the bowl and adjustable removable handle hereinafter set forth, pointed out in my claim, and illustrated in the accompanying drawings, in which—

Figure 1 shows the bowl of a spoon and a handle detachably connected therewith as adapted for use in the right hand, and Fig. 2 as used in the left hand. Fig. 3 is a sectional view of the bowl.

The letter A designates the bowl, and B an integral shank at its rear end, to which is fixed a handle C to extend at right angles from the shank and bowl. The shank B has a transverse screw-threaded bore, and the handle C a screw on its end adapted to enter said bore as required to detachably and adjustably connect the handle with the bowl. To adapt it for use in the left hand, the handle can be removed and fixed in the bore of the shank to extend in a reverse direction, as shown by Fig. 2.

It is obvious the size and shape of my spoons may vary to accomplish the purpose of my invention in providing bowls that extend at right angles to the handles.

Having described the purpose and construction of my invention, its practical utility will be readily understood by persons familiar with the art to which it pertains, and what I claim as new, and desire to secure by Letters Patent, is—

A transformable spoon consisting of a bowl having an integral shank and a screw-threaded bore extended through said shank and a handle having a screw-threaded end fitted in said bore to extend at right angles to the shank and bowl.

ALEXANDER ST. CLAIR.

Witnesses:
F. C. STUART,
THOMAS G. ORWIG.